United States Patent [19]

Suttles

[11] 4,135,837
[45] Jan. 23, 1979

[54] SHELVING ASSEMBLY

[75] Inventor: James M. Suttles, Elberton, Ga.

[73] Assignee: The Mead Corporation, Dayton, Ohio

[21] Appl. No.: 870,847

[22] Filed: Jan. 19, 1978

[51] Int. Cl.² .............................................. B25G 3/00
[52] U.S. Cl. .................................. 403/245; 403/252; 403/253; 403/353; 211/189
[58] Field of Search ............... 403/244, 245, 246, 252, 403/253, 254, 255, 353, 380; 211/189, 190, 191, 186, 187

[56] References Cited

U.S. PATENT DOCUMENTS

| 2,556,839 | 6/1951 | Cretella | 403/353 X |
| 3,217,894 | 11/1965 | Shewell | 211/191 |
| 3,749,465 | 7/1973 | Newcomer | 312/263 X |

*Primary Examiner*—Wayne L. Shedd

*Attorney, Agent, or Firm*—Walter M. Rodgers; Walter A. Rodgers

[57] ABSTRACT

Shelving assembly includes vertically disposed corner posts interconnected at their bottom ends by base panels secured to the posts by disjointable connecting means and interconnected at their top ends by header panels disjointably secured to the posts together with a plurality of vertically spaced clips disjointably mounted to each post and arranged to support a plurality of shelves except for the bottom shelf which is arranged for disposition in a horizontal attitude and which also is tiltable by virtue of its support along its rear edge by a tilt beam, the shelf which is disposed immediately above the lowermost shelf being arranged to form a tiltable back portion for the device which is disposed in approximately perpendicular relation to the lowermost shelf when tilted.

10 Claims, 12 Drawing Figures

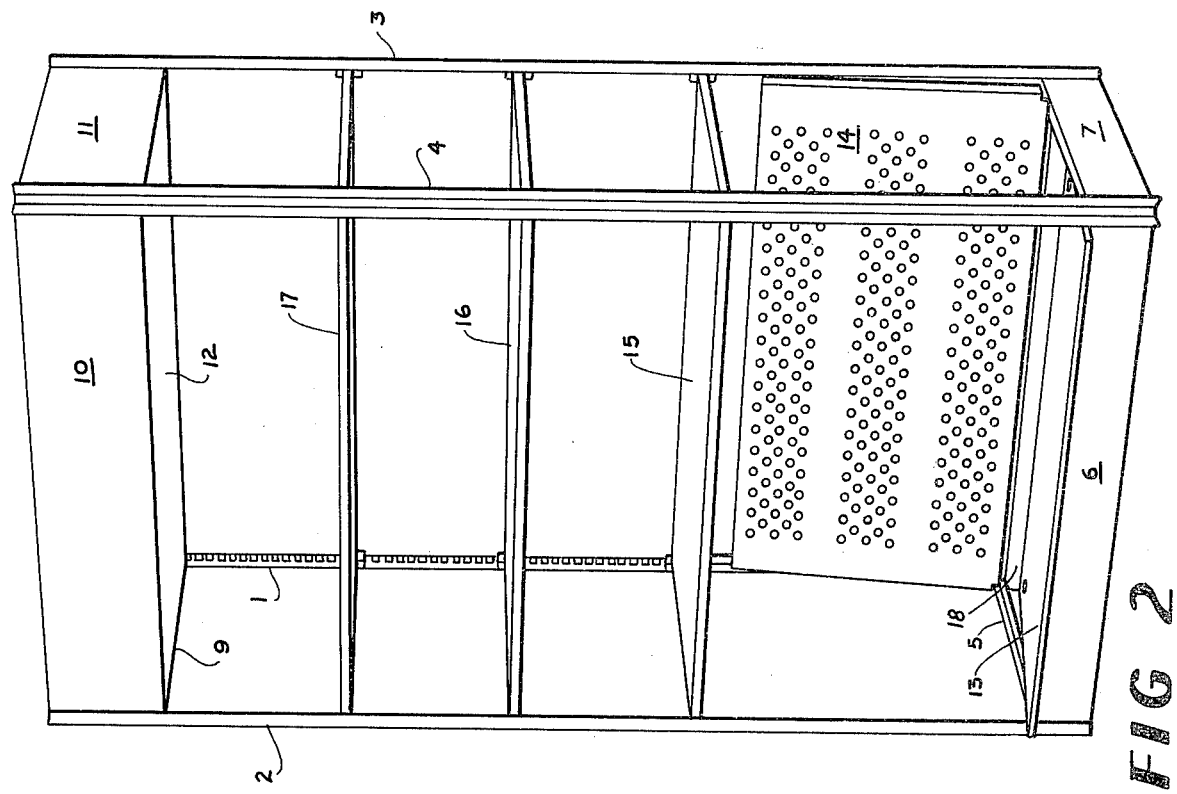
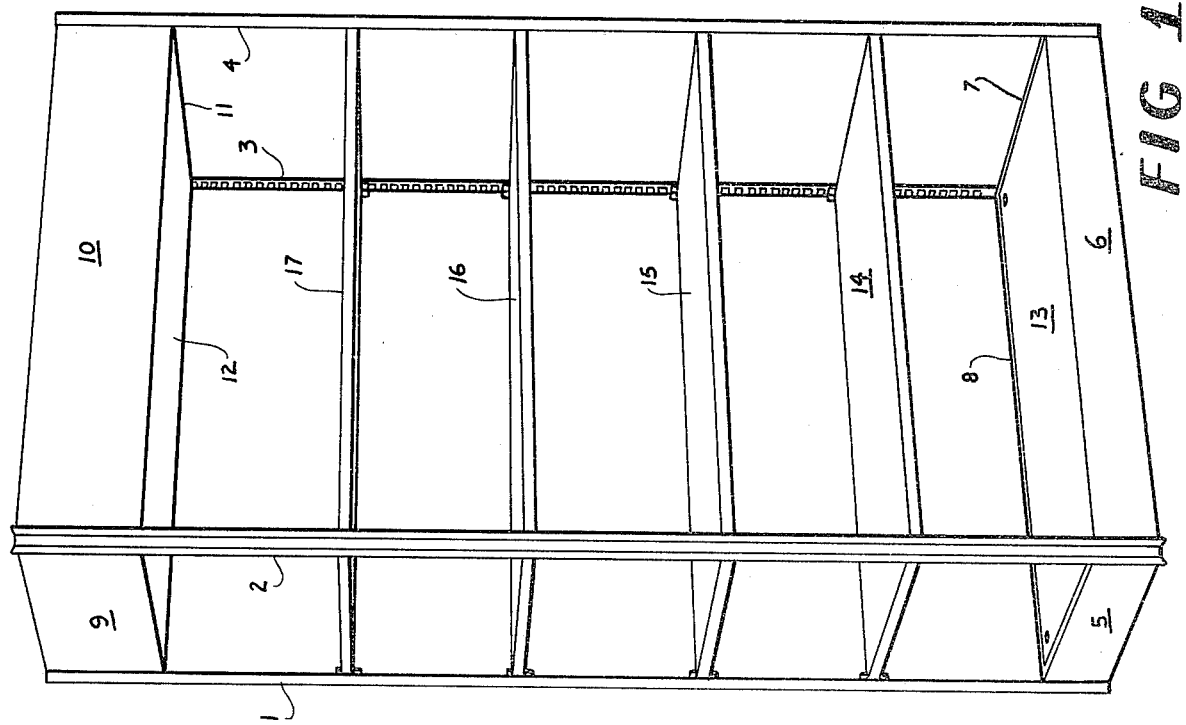

SHELVING ASSEMBLY

Shelving which is used for example in retail outlets for displaying a variety of products such as bottled soft drinks, for example, must be adaptable for easy assembly and disassembly without requiring complicated tools or a variety of nuts and bolts and the like which are readily misplaced and which sometimes require a multiplicity of sizes together with attendant difficult and time consuming assembly operations.

According to this invention in one form, the corner posts of a shelving assembly are interconnected at their bottom ends by readily disjointable coupling means which secures base panels at their ends to the bottoms of the corner posts and wherein the corner posts are connected at their upper ends by horizontal headers which are disjointably connected to the posts.

BRIEF DESCRIPTION OF THE DRAWINGS

For a better understanding of the invention reference may be had to the following detailed description taken in conjunction with the accompanying drawings in which FIG. 1 is a perspective view of a shelf assembly constructed according to the invention and which shows the lowermost shelf in its horizontal attitude and in which the shelf immediately above the lowermost shelf is horizontally disposed;

FIG. 2 is a perspective view similar to FIG. 1 but which shows the lowermost shelf in its tilted attitude and which shows the shelf which normally is disposed immediately above the lowermost shelf in a tilted condition and forming the back support of the lowermost portion of the shelving assembly;

FIG. 11 is a cross sectional view taken along the line 11—11 indicated in FIG. 10 and in which

DETAILED DESCRIPTION

Figure 3:
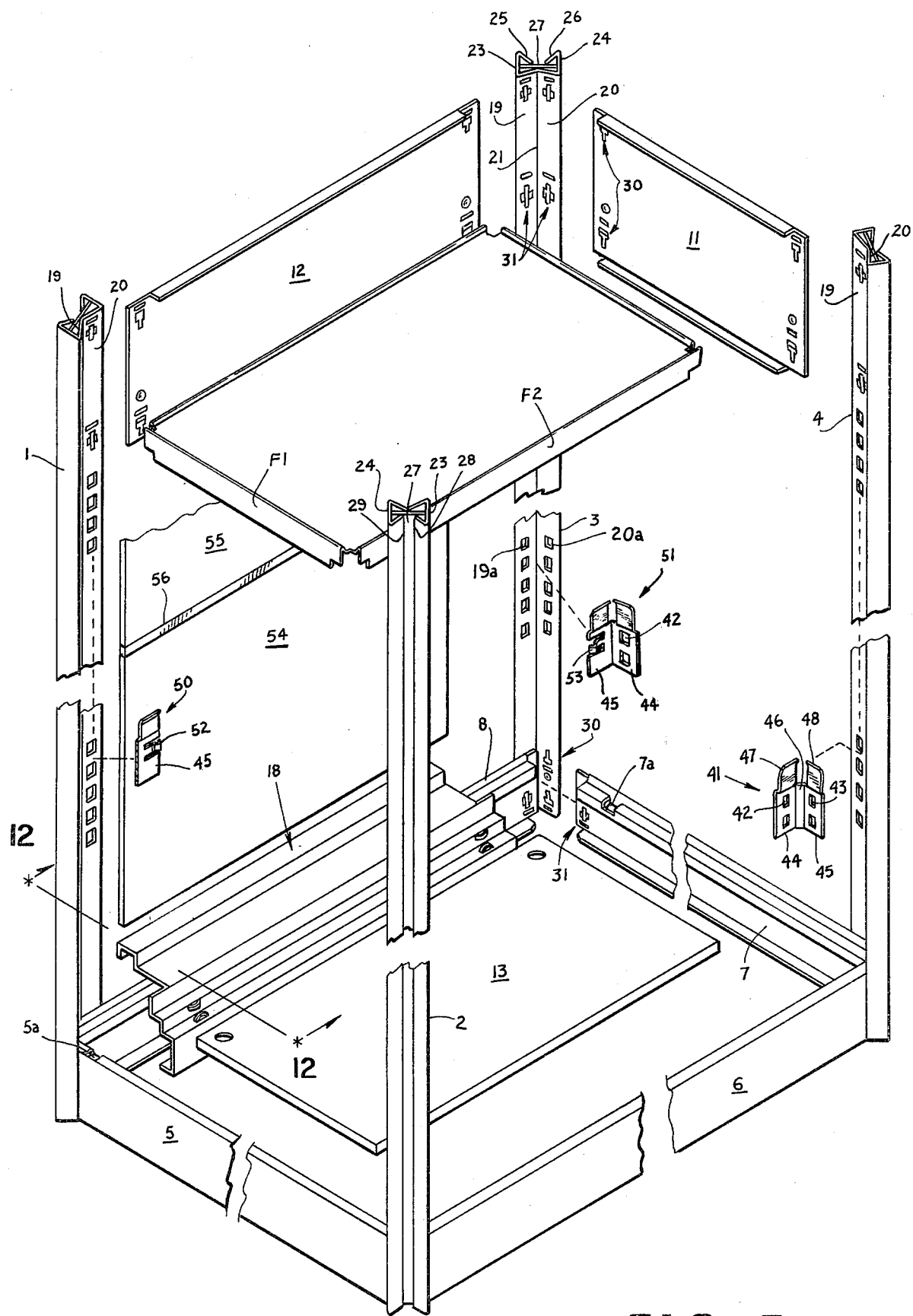
FIG. 3 is a partially exploded perspective view of assemblies such as are depicted in FIGS. 1 and 2 and which depicts certain of the constructional details formed according to features of this invention.

With reference to FIG. 1, a shelf assembly is shown which comprises vertically disposed corner posts 1, 2, 3 and 4. These corner posts are interconnected at their lower ends to the ends of base panels 5, 6, 7 and 8 by disjointable connecting means formed according to one aspect of this invention. The corner posts 1-4 are interconnected at their top ends by header panels 9, 10, 11 and 12 which may constitute advertising surfaces and which preferably are interconnected with the corner posts by disjointable connecting means such as is used in connection with the base panels 5-8 and the lower ends of the corner posts.

The structure of FIG. 1 includes a plurality of shelves designated by the numerals 13-17.

The shelves 13-17 are disjointably mounted and in order to convert the shelving arrangent of FIG. 1 into an arrangement wherein the lowermost shelf 13 is tilted rearwardly, it is simply necessary first to remove the shelf 14 and then to pull lowermost shelf 13 forwardly to the position shown in FIG. 2 and thereafter to mount the shelf 14 in a tilted position as shown in FIG. 2. These tilted dispositions of shelves 13 and 14 as shown in FIG. 2 are made possible in part by a shelf supporting tilting beam generally designated by the numeral 18.

Figure 8:
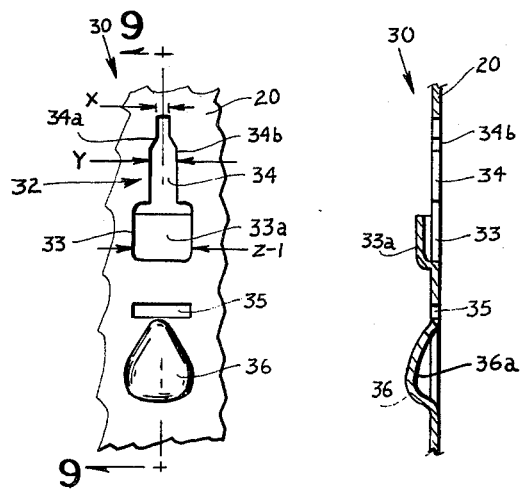
FIG. 8 is a fragmentary view of certain components used in disjointably connecting certain parts.
Figures 9, 10:
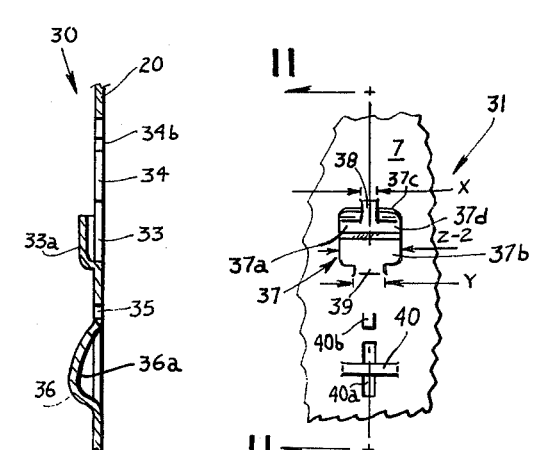
FIG. 9 is a cross sectional view taken along the line designated 9—9 in FIG. 8.
FIG. 10 is a fragmentary view of disjointable connecting means which cooperates with the structure of FIGS. 8 and 9.

As is apparent particularly in FIG. 3 in connection with the corner posts such for example as corner post 3, the post comprises a pair of support strips 19 and 20 which are secured together along their adjacent edges as indicated at 21 and are provided with flange panels 23, 24 secured to support strips 19 and 20 and outer panels 25 and 26 which are secured to flange panels 23 and 24. A decorative strip 27 is inserted internally within the structure and extends from end to end and forms a cover for the space between the inner edges 28 and 29 of the back strips 25 and 26 as is best shown in connection with corner post 2. The support strips are sometimes referred to herein as having planar surfaces. All of the base panels such as 5-8 and the header panels such as 9-12 are secured to the vertical posts by disjointable connecting means formed according to this invention. Only one such connecting means such for example as that designated in FIG. 3 generally by the numeral 30 and formed in support strip 20 together with its associated connecting means formed in panel 7 and designated generally by the numeral 31 in FIG. 3 will be described. FIGS. 8 and 9 are enlarged fragmentary views of the connecting structure 30 while FIGS. 10 and 11 constitute enlarged fragmentary views of connecting structure 31.

With reference to FIGS. 8 and 9, the connecting structure 30 includes a locking aperture generally designated by the numeral 32 and which includes an entry portion 33 whose width is indicated at Z-1 and a narrow locking portion 34. Locking portion 34 includes a narrow end portion whose width is indicated at X and a wider base portion whose width is indicated at Y. As is apparent in FIG. 9 entry portion 33 includes a debossed area 33a which enhances the strength of the structure by interconnecting opposite edges of the entry portion 33 of the locking slot 32. Also formed in support strip 20 and constituting a part of securing means 30 is positioning receptacle means 35 together with a teardrop-shaped debossed receiving area 36 having a gradually sloping surface 36a.

Figure 11:
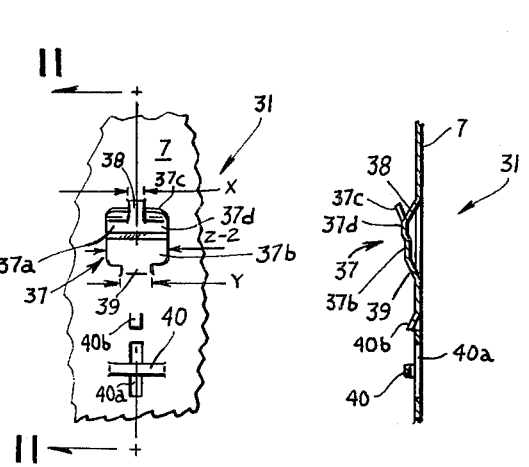

For cooperating with the connecting structure 30 and as is shown in FIGS. 10 and 11, connecting structure 31 is provided and includes a locking plate 37 struck from panel 7 and held in spaced parallel relation thereto by a pair of supporting tabs 38 and 39. The width of locking plate 37 is indicated at Z-2 and the width of supporting tab 38 is indicated at X which is substantially the same dimension as is indicated at X in FIG. 8. Dimensions Y indicated in FIGS. 8 and 10 are substantially the same but are greater than dimension X to provide side clearance so as to facilitate starting of a locking operation. Dimension Z-1 is greater than dimension Z-2 also to facilitate the start of a locking operation. A positioning protrusion 40 is also formed in panel 7 and projects outwardly from the planar surface thereof as is apparent from FIG. 11. Slot 40a is formed in panel 20 so as to afford visibility of protrusion 40 and receptacle means 35 as they are brought into coincidence during a locking operation. Protrusion 40b engages receptacle means 35 during an initial phase of the formation of a panel interlocking operation and temporarily holds the parts together while the parts are being moved into their final interlocked relationship. Bevelled edge 37c forms an extension of clearance panel 37d and facilitates the start of an interlocking action.

In order to form a disjointable connection between panels such as 20 and 7, for example, it is simply necessary to orient these panels and to move them together so that initially the locking plate 37 is disposed in coincidence with the entry portion 33 of the locking slot 32 and so that the positioning protrusion 40 is in coincidence with the receiving means 36. Thereafter panels 20 and 7 are moved relative to each other so that in effect panel 7 moves upwardly as viewed for example in FIGS. 10 and 11 relative to panel 20. This relative movement causes the supporting tab 38 to slide along the locking portion 34 of locking slot 32 and simultaneously the locking plate 37 moves behind panel 20 as viewed for example in FIG. 8. This motion continues until supporting tab 39 enters the locking portion 34 of locking slot 32. Simultaneously positioning protrusion 40 rides out of the receiving means 36 along gradually sloping surface 36a and snaps into the positioning receptacle means 35. Once this occurs, the locking plate is securely held in position with its side edges such as 37a and 37b underlying the edges 34a and 34b of that portion of panel 20 which defines the locking portion 34 of locking slot 32. When this operation is completed the panel 7 is interlocked with the lower end of strip 20 and of post 3.

In order to enhance the security and stability of the connection, a first part of locking portion 34 which is remote from entry portion 33 and at the end of locking portion 34 preferably is slightly narrower as indicated at X than a second part of locking portion 34 which is adjacent entry portion 33 and designated Y. In one embodiment of the invention this difference is approximately three hundredths of one inch. In addition the supporting tab 38 is of approximately the same width as indicated at X as the aforementioned first or end part of locking portion 34 while supporting tab 39 is of approximately the same width as the aforementioned second part of locking portion 34 as indicated at Y.

All of the base panels such as 5, 6 and 8 as well as the opposite end of base panel 7 are interlocked with the lower ends of the posts 1–4 in like fashion. Similarly the header panels 9–12 are interlocked with the upper ends of the posts 1–4 except for the sake of expediency, and in order to demonstrate the versatility of the locking means formed according to this invention, the structure 31 such as that shown in FIGS. 10 and 11 is formed in the support strips such as 19 and 20 of the post 3 rather than in the header panels 11 and 12. Similarly structure 30 such as is shown in FIGS. 8 and 9 is formed in the header panel 11 rather than in the support strips 19 and 20. As is indicated in FIG. 3 the connecting means of FIGS. 8 and 9 comprising the locking aperture 32, positioning receptacle means 35 and receiving means 36 may be formed in support strips 19 and 20 or in panels 7 and 11 and the structure 31 of FIGS. 10 and 11 may be formed respectively in panels 7 and 11 or in support strips 19 and 20. It is also possible to provide locking aperture 32 and positioning protrusion 40 on one of the two elements to be interconnected, while providing locking plate 37, receiving means 36 and locking aperture 35 on the other element.

The base panels and the header panels may be interconnected with the vertical posts simply by the use of a rubber mallet and no other tools are necessary. Furthermore no readily misplaced bolts, nuts, rivets and the like are necessary and the time of assembly is substantially reduced from that required in connection with conventional assembly procedures. In order to disassemble the interconnected parts, a screwdriver blade may be inserted therebetween and manipulated so as to cause the positioning protrusion 40 to become dislodged from the receiving means 35.

The shelves such as 14–17 inclusive are supported by disjointably mounted clips which are supported by the corner posts 1–4. For example along the front edge of the display and in conjunction with corner posts 2 and 4, a clip such as that designated by the numeral 41 in FIG. 3 is provided with support tabs 42 and 43 which are struck from support panels 44 and 45 which panels are secured to a base panel 46 and upstanding slightly curved tabs 47 and 48 are disposed atop panels 44 and 45 so as to allow shelf flanges such as flanges F1 and F2 to be received between the tabs such as 47 and 48 and the associated support strips 19 and 20 of the corner posts. For a more complete description of clips such as clips 41, reference may be had to U.S. Patent application Ser. No. 685,519 filed May 12, 1976 and owned by the assignee of this invention.

Clips associated with the rear corner posts such as 1 and 3 are somewhat different from the clips such as 41 as indicated at 50 and 51. Clip 50 is here designated as the left hand clip and clip 51 is designated as the right hand clip such designations being referenced from a vantage point at the front of the assembly. Clips 50 and 51 include tabs such as 42 and 43 and differ from clips 41 primarily in that they are provided with deformable fingers 52 and 53 which perform a specialized function in conjunction with the tilting of one of the shelves as will be explained. The left hand part of clip 50 is broken away for clarity, it being understood that panel 44 thereof is identical to panel 44 of clip 51.

Of course the tabs such as 42 and 43 of all of the support clips 41, 50 and 51 enter suitable apertures such as are designated at 19a and 20a in connection with post 3 as is obvious, such apertures of course being formed in all of the support strips of all of the vertical posts.

Clips 50 and 51 when mounted in place on posts 3 and 1 respectively overlap the adjacent side edges of back panels such as 54 and 55 and thus capture the edges of those panels between the panels such as 45 of tabs 50 and 51 and the associated support strip such as 19 or 20 of posts 3 and 1 and thus hold panels 54 and 55 in assembled position. Tabs 42 are disposed in holes 20a of support strip 20. A seam strip 56 overlaps the junction between panels 54 and 55. As is obvious a single back panel could be used instead of the panels 54 and 55 and the strip 56.

Figure 4:
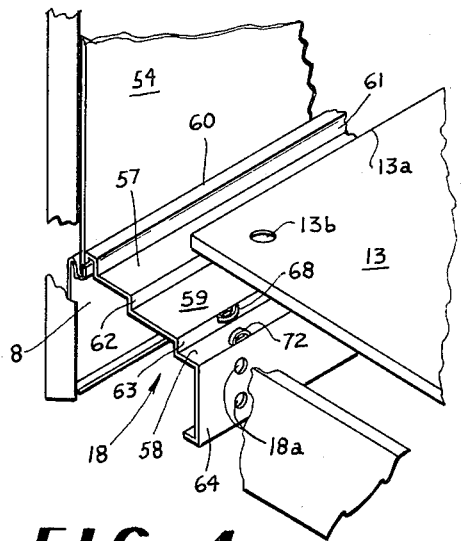
FIG. 4 is an enlarged fragmentary perspective view of a portion of the structure shown in FIG. 3.

In order to render the lowermost shelf 13 tiltable and as disclosed and claimed in U.S. Patent application Ser. No. 871,080 filed Jan. 19, 1978 the shelf supporting tilting beam 18 as best shown in FIG. 4 includes a primary ledge 57 and a tilting ledge 58 together with an intermediate ledge 59 as well as a shelf panel 60. Shelf panel 60 is interconnected with shelf supporting primary ledge 57 by vertical spacer panel 61 while primary ledge 57 is interconnected with intermediate ledge 59 by spacer panel 62 and intermediate ledge 59 is interconnected with tilting ledge 58 by spacer panel 63. Load bearing panel 64 is interconnected with an edge of tilting ledge 58 and its lower edge rests on a supporting surface such as a floor or the like. A flange panel 65 is interconnected to the rear edge of shelf panel 60 and is inserted in a groove 66 formed atop base panel 8 and in front of the lower edge 54a of back panel 54 in order to secure the tilting beam 18 against movement in a forward and rearward direction. Of course the beam 18 is captured between side base panels 5 and 7 and thus is incapable of sidewise movement.

In order to cause the lowermost shelf 13 to assume a horizontal attitude, its rear edge 13a is simply moved into abutting engagement with spacer panel 61 so that the rear edge of shelf 13 rests on primary shelf supporting ledge 57 and the front edge rests on front base panel 6. Spacer panel 61 is of approximately the same thickness as shelf 13. When so disposed the shelf appears as shown in FIG. 1.

Figure 5:
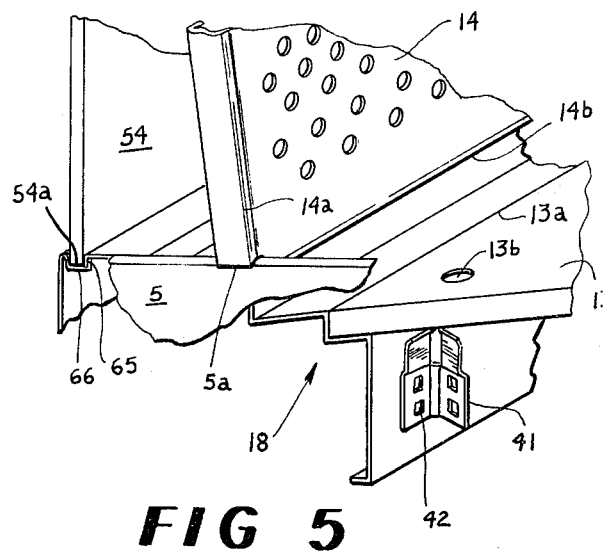
FIG. 5 is an enlarged fragmentary perspective view somewhat similar to FIG. 4 but which shows certain parts in tilted condition.
Figure 12:
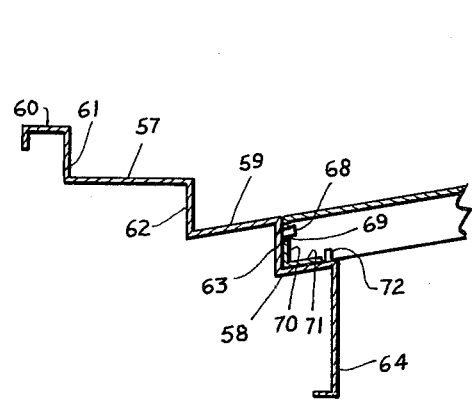
FIG. 12 is a cross sectional view taken along the line designated 12—12 in FIG. 3.

In order to tilt the shelf 13, it is simply elevated by means of finger gripping apertures such as 13b and moved forward so that its rear edge 13a falls into abutting engagement with spacer panel 63 and so that its rear edge rests upon tilting ledge 58. Of course tilting ledge 58 is at a lower level than primary ledge 57 while the front edge of shelf 13 is disposed atop base panel 6 thus to provide tilting action for shelf 13 as shown in FIGS. 2 and 5. It is apparent that tilting ledge 58 and intermediate ledge 59 are disposed at the same angle of tilt as is the shelf 13 when disposed in its tilted position while the primary panel 57 is horizontally disposed as is best shown in FIG. 12. Spacer panel 63 is of approximately the same thickness as shelf 13.

For the purpose of securing the shelf 13 against forward and upward motion, a projection 68 is formed on spacer panel 63 and enters an aperture 69 formed in edge flange 70 of shelf 13 while horizontal flange panel 71 is disposed behind projection 72 formed in tilting ledge 58. Thus the rear edge of shelf 13 is secured against movement in any direction and the weight of displayed items supported by shelf 13 further insures stability of that shelf and prevents movement thereof relative to the other parts of the assembly.

In order to form a tilted back support for items to be displayed on shelf 13, the shelf 14 is simply elevated and lifted out of its assembled position shown in FIG. 1 and reassembled as shown in FIG. 5. The two front clips 41 are removed from posts 2 and 4 and are stored by causing tabs such as 42 to enter holes such as 18a as shown in FIGS. 4 and 5. In this position the lowermost edge such as 14b rests in a slot such as 5a formed in the upper edge of base panel 5 and such as 7a formed in the upper edge of base panel 7. Slots 5a and 7a are disposed in substantial transverse alignment with the rear part of intermediate ledge 59 and the lowermost edge 14a of shelf 14 rests atop intermediate ledge 59. The two clips 41 are removed from posts 2 and 4 and are stored for future reconversion by inserting their tabs 42 in holes 18a. Two parts of holes 18a are provided for the two clips 41.

Figures 6, 7:
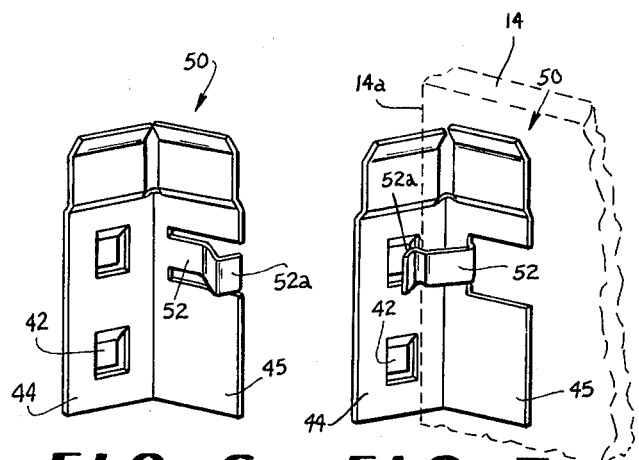
FIG. 6 is a perspective view of a left hand support clip formed according to the invention and used for disjointably supporting shelves at their rear edges and which may be used to hold the tilted back shelf in place.
FIG. 7 is a view similar to FIG. 6 which shows a deformable element in bent condition.

In order to secure the upper edge of shelf 14 in position adjacent the back posts 1 and 3, the deformable fingers 52 and 53 of the clips 50 and 51 are bent inwardly and the end having groove 52a is bent over the edge 14a of shelf 14 as indicated in FIG. 7 at 52a. The shelf 14 is shown in dotted lines. When so bent, the inwardly deformed groove 52a engages and holds the edge projection 14a of shelf 14 and secures the upper part of the shelf snugly adjacent the back panel 54 and the corner post 1. Finger 53 is similarly bent and holds the opposite side of shelf 14 snugly against back panel 54 and post 3. When so arranged the assembly is disposed in its tilted attitude as represented by FIGS. 2 and 5.

In order to convert the stand from the arrangement of FIG. 2 to that of FIG. 1 the above procedure is reversed. Of course clips 41 are detached from panel 64 and mounted on posts 2 and 4 and clips 50 and 51 are reoriented on posts 1 and 3 as is obvious.

From the description above it is apparent that the assembly constructed according to this invention may not only be quickly assembled and disassembled and sturdily secured when assembled, this mechanism is adaptable for use as a display such as is shown in FIG. 1 for individual large primary packages such as 32 ounce and 64 ounce soft drink bottles while the arrangement may readily be converted to the arrangement shown in FIG. 2 wherein large primary packages such as 32 ounce and 64 ounce bottles may be mounted on shelves such as 15, 16 and 17 while other items such as soft drink bottles mounted in individual basket style carriers for example may be stacked on the tilted shelf 13 and may rest against the tilted back panel 14 which doubles as a back panel in FIG. 2 and as the shelf 14 in FIG. 1.

The embodiments of the invention in which an exclusive property or privilege is claimed are defined as follows:

1. Disjointable connecting means for securing together a pair of structural elements each having planar surfaces, said connecting means comprising a locking plate secured to one of said elements and disposed in fixed spaced generally parallel relation to the planar surface thereof, and a locking aperture formed in the other of said elements and extending through the planar surface thereof, said locking aperture having an entry portion configured to receive said locking plate and also having a locking portion in communication with said entry portion, said locking portion being configured to prevent passage therethrough of said locking plate in a direction normal to said planar surfaces when said locking plate is moved into registry with said locking portion of said locking aperture, said locking plate being secured to said one element by a pair of oppositely disposed supporting tabs.

2. Connecting means according to claim 1 wherein a debossed area interconnects opposite edges of said entry portion.

3. Connecting means according to claim 1 wherein the locking portion of said locking aperture is configured to engage both edges of both of said tabs when said locking plate is in registry with said locking portion.

4. Connecting means according to claim 1 wherein said entry portion of said locking aperture comprises at least in part a debossed area generally parallel to the planar surface of said other element.

5. Disjointable connecting means for securing together a pair of structural elements each having planar surfaces, said connecting means comprising a locking plate secured to one of said elements and disposed in fixed spaced generally parallel relation to the planar surface thereof, and a locking aperture formed in the other of said elements and extending through the planar surface thereof, said locking aperture having an entry portion configured to receive said locking plate and also having a locking portion in communication with said entry portion, said locking portion being configured to prevent passage therethrough of said locking plate in a direction normal to said planar surfaces when said locking plate is moved into registry with said locking portion of said locking aperture, a first part of said locking portion of said locking aperture which is remote from said entry portion of said locking aperture being slightly narrower than a second part of said locking portion of said locking aperture which is adjacent said entry portion thereof.

6. Connecting means according to claim 5 wherein said locking plate is secured to said one element by a pair of oppositely disposed supporting tabs and wherein the width of one of said supporting tabs is approximately the same as the width of said first part of said locking portion of said locking aperture and wherein the width of the other of said supporting tabs is approximately the same as the width of said second part of said locking portion of said locking aperture.

7. Disjointable connecting means for securing together a pair of structural elements each having planar surfaces, said connecting means comprising a locking plate secured to one of said elements and disposed in fixed spaced generally parallel relation to the planar surface thereof, and a locking aperture formed in the other of said elements and extending through the planar surface thereof, said locking aperture having an entry portion configured to receive said locking plate and also having a locking portion in communication with said entry portion, said locking portion being configured to prevent passage therethrough of said locking plate in a direction normal to said planar surfaces when said locking plate is moved into registry with said locking portion of said locking aperture, a positioning protrusion formed on the planar surface of one of said elements, positioning receptable means formed on the planar surface of the other of said elements and disposed to receive said positioning protrusion when said locking plate is in registry with said locking portion of said locking aperture, said positioning protrusion and said positioning receptacle means being formed on the planar surfaces of said elements respectively, and receiving means formed in said other element and disposed to receive said positioning protrusion when said locking plate is in registry with said entry portion of said locking aperture.

8. Connecting means according to claim 7 wherein said receiving means comprises a debossed area formed in the planar surface of said other element.

9. Connecting means according to claim 7 wherein said locking plate is secured to said one element by at least one supporting tab.

10. Connecting means according to claim 7 wherein said positioning receptacle means comprises an aperture formed in the other of said elements.

* * * * *